Oct. 3, 1944.  A. G. BADE  2,359,540

VARIABLE SPEED TRANSMISSION

Filed June 30, 1941  2 Sheets-Sheet 1

Alfred G. Bade
INVENTOR.

BY
ATTORNEY.

Oct. 3, 1944. A. G. BADE 2,359,540
VARIABLE SPEED TRANSMISSION
Filed June 30, 1941 2 Sheets-Sheet 2
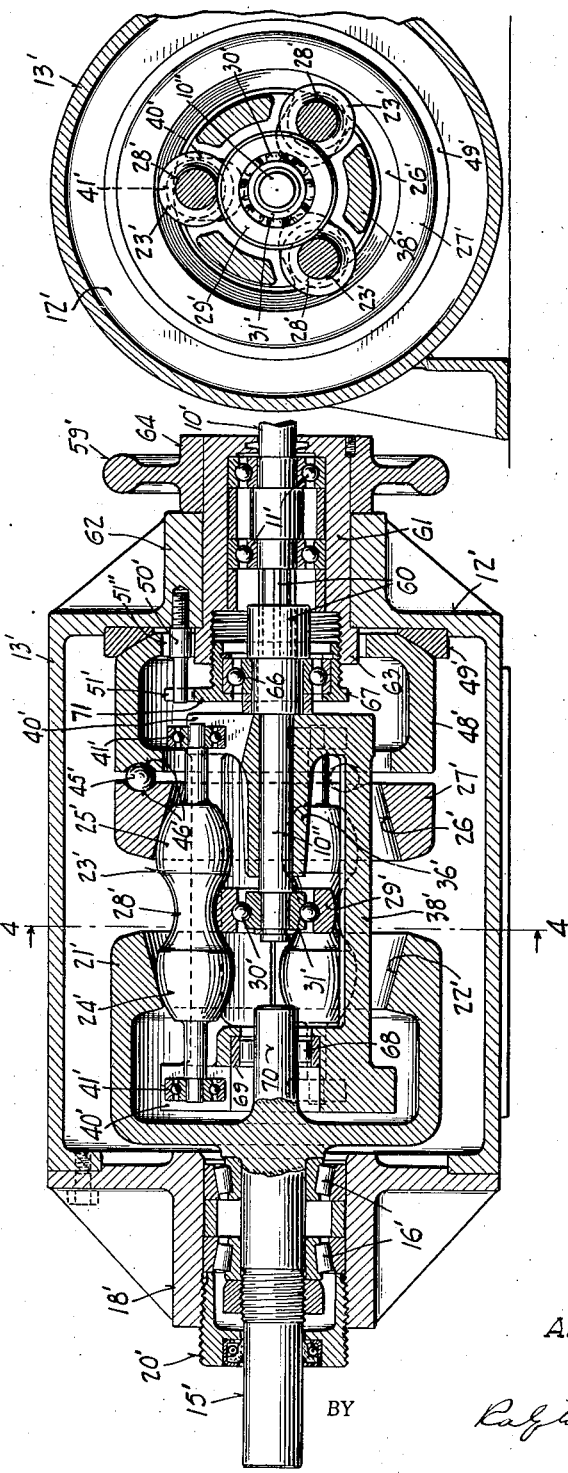
Alfred G. Bade
INVENTOR.
BY
ATTORNEY.

Patented Oct. 3, 1944

2,359,540

UNITED STATES PATENT OFFICE 2,359,540

VARIABLE SPEED TRANSMISSION

Alfred G. Bade, Wauwatosa, Wis., assignor to The Falk Corporation, Milwaukee, Wis., a corporation of Wisconsin Application June 30, 1941, Serial No. 400,452

10 Claims. (Cl. 74—281)

This invention relates to variable speed transmission.

In my copending application, Serial No. 397,711, I have disclosed a gearless type of transmission involving a plurality of planet rollers each held in frictional rolling engagement with two torque reacting rings by an appropriate fulcrum means, the rings and fulcrum means providing a three point support for each of the rollers. In the form of transmission therein shown the several rollers are permanently inclined relative to the axis about which they revolve, and one of the torque reacting rings is driven by the rollers, while the other is non-rotatable but adjustable lengthwise of the rollers to regulate the speed ratio of the transmission.

One object of the present invention is to provide a variable speed mechanism of that general type in which the several rollers are adjustable to regulate the speed ratio.

Other more specific objects and advantages will appear from the following description of two illustrative embodiments of the present invention.

In the accompanying drawings:

Fig. 3 is a view similar to Fig. 1 of a variable speed transmission of somewhat different form embodying the invention.

Fig. 4 is a sectional view taken on the line 4—4 of Fig. 3.

Figure 2:
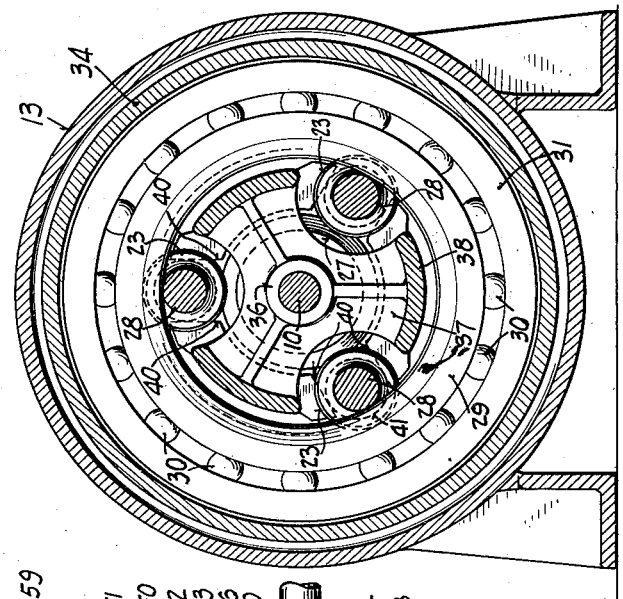
Fig. 2 is a transverse section taken substantially along the line 2—2 of Fig. 1.
Figure 1:
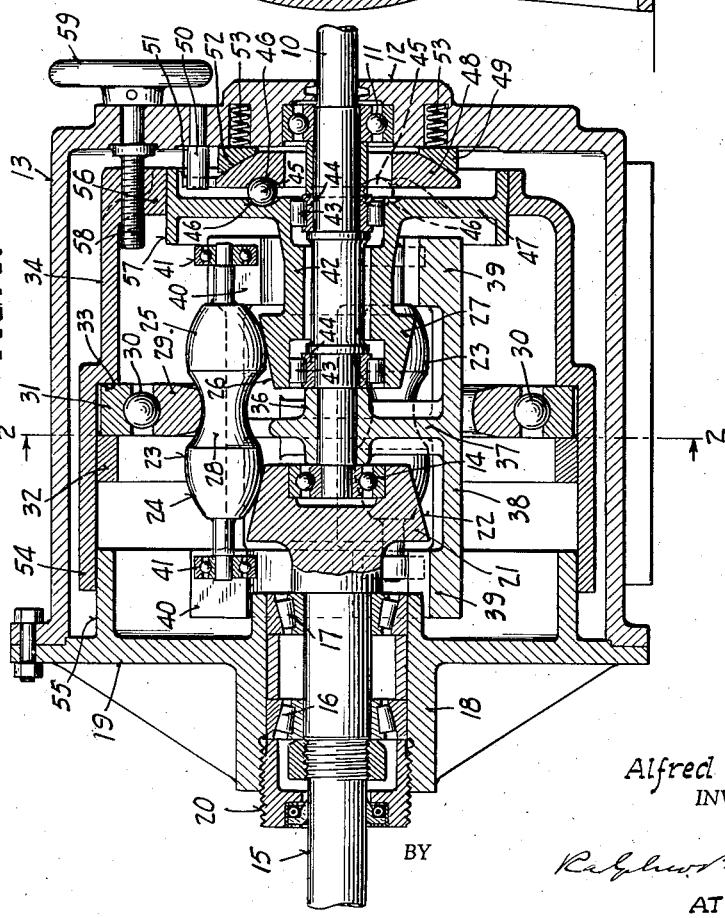
Figure 1 is a vertical longitudinal sectional view of a variable speed transmission constructed in accordance with the present invention.

The variable speed transmission shown in Figs. 1 and 2 is provided with a drive shaft 10 supported in a bearing 11 fixed in the end wall 12 of a housing 13 and additionally supported at its forward end in a bearing 14 seated in the inner end of a driven shaft 15. The driven shaft 15 is journalled in a pair of spaced bearings 16 and 17 axially fixed with respect to the shaft 15 but axially movable in a hollow hub 18 in which they are seated. The hub 18 is carried by an end plate 19 removably attached to the forward end of the housing. The bearings 16 and 17 are positioned in the hub 18 by suitable means such as a bushing 20 screwed into the hub.

The shaft 15 is driven by a head 21 carried by the inner end thereof and having a tapered face 22 in frictional rolling engagement with a plurality of planet rollers 23 and particularly with a tapered end section 24 of each. Each of the rollers 23 is also provided with an oppositely tapered section 25 at the opposite end thereof in frictional rolling engagement with the tapered face 26 of a non-rotating head 27 mounted in a manner to be later described. The faces 22 and 26 are preferably frustro-conical and slope toward each other, while the surfaces of the tapered sections 24 and 25 are preferably convexly curved longitudinally to reduce the area of contact thereof with the faces 22 and 26, respectively, and to permit a rocking action of said sections thereon.

Each of the rollers 23 is also reduced intermediate its ends to form a round neck portion 28 in frictional rolling engagement with a freely rotating ring 29 which provides a fulcrum support for the several rollers. In this instance the ring 29 encircles the rollers and the surface of the neck portion 28 is preferably concavely curved longitudinally in order to permit a tilting action of the rollers about the inner face of the ring 29. The ring 29 is shown supported upon a circular series of anti-friction balls 30 confined between the ring 29 and a non-rotating ring 31, the latter being axially confined between an anchor ring 32 and an annular shoulder 33 formed in a surrounding substantially cylindrical carrier 34 to be later described.

The several rollers 23 are driven from the drive shaft 10 preferably through an appropriate cage. In this instance the cage is supported by a central hub 36 fixed to the drive shaft 10 for rotation therewith, the hub 36 being connected through suitable radial webs 37 to an outer substantially cylindrical portion 38 surrounding the heads 21 and 27 and interrupted at intervals to accommodate the rollers 23. The cage is also provided with end rings 39 radially slotted to provide pairs of opposed guide faces 40, the guide faces of each pair coacting with an interposed bearing 41 on the end of a roller 23 to drive the rollers and to maintain the axis of each roller in a radial plane of the drive shaft 10.

The head 27 is carried by a sleeve 42 supported at each end by a series of anti-friction rollers 43 confined in an inner race 44 fixed to the drive shaft 10, so that the latter is freely rotatable relative to the sleeve 42. The sleeve 42 however is slidable lengthwise of the rollers 43, so as to permit axial movement of the sleeve and head 27.

It will be noted that by screwing the bushing 20 into the hub 18 the shaft 15 and head 21 thereon may be forced against the roller sections 24 to urge the latter outwardly, and the fulcrum ring 29 reacting to this outward thrust urges the other roller sections 25 inwardly against the head 27. In this way initial contact pressures may be established between the several rollers 23 and the heads 21 and 27. Provision is also preferably made for automatically increasing those contact pressures in accordance with increases in torque load on the machine, and in the machine shown this is accomplished by mechanism responsive to the torque load on the head 27. Although this might be accomplished in various ways, a mechanism satisfactory for the purpose will now be described.

The sleeve 42 carrying the head 27 is in this instance retained against rotation by a camming device of a well known type comprising a plurality of balls 45, preferably three in number, interposed between pairs of opposed cam grooves 46 which in this instance are formed in opposed faces of a disk 47 fixed to the sleeve 42 and a reaction disk 48 seated on a ring 49 which bears against the end wall 12 of the housing. The reaction disk 48 shown is retained against rotation by a pin 50 anchored in the end wall 12 and engaged in a radial slot 51 in the disk 48. The mating surfaces 52 of the disk 48 and ring 49 are preferably spherical so as to permit free tilting of the disk 48 in a manner to equalize the pressures between the several balls 45 and cam grooves 46. A plurality of springs 53 are preferably provided, seated in the end wall 12 and bearing against the ring 49, to maintain an initial pressure between the ring 49, disk 48, balls 45 and disk 47. The arrangement is such that, as the head 27 tends to rotate under the torque imposed by the rollers 23, the balls 45 reach against the cam grooves 46 to produce a wedging action which forces the disk 47, sleeve 42, and head 27 toward the rollers 23, thereby increasing the contact pressures between the head 27 and roller sections 25 and between the roller sections 24 and the head 21.

It will of course be understood that as the several planet rollers 23 are caused to revolve with the drive shaft 10, through the instrumentality of the cage 38, they are also caused to rotate about their individual axes as a result of the rolling engagement of their sections 25 with the tapered face 26 of the non-rotating head 27, and that by reason of the rolling engagement between their sections 24 with the tapered face 22 of the head 21, the head 21 and driven shaft 15 are thereby caused to rotate at a speed and in a direction dependent upon the positional relation of the points of contact of the rollers with the tapered faces 26 and 22. Provision is made for shifting the rollers in a manner to effect contact thereof at various points along said tapered faces. Mechanism for that purpose may assume various forms but that shown will now be described.

In the transmission shown in Figs. 1 and 2 the longitudinal position of the several planet rollers 23 relative to the tapered faces 22 and 26 is varied and controlled by the fulcrum ring 29, and the structure 34 in which it is mounted is axially movable for the purpose. In this instance the forward cylindrical end 54 of the carrier structure 34 is slidably supported upon a circular flange 55, projecting from the end plate 19 of the housing, and its circular rear end 56 is slidably seated upon a flange 57 carried by the disk 47. The carrier is actuated and controlled by appropriate means such as an axially fixed control screw 58 in screw threaded engagement with the rear end 56 thereof and journalled in the housing end wall 12. The screw 58 is shown equipped with a hand wheel 59.

The arrangement is such that by manipulation of the hand wheel 59 in one direction or another the carrier 34 and ring 29 may be axially shifted to impart lengthwise movement to the rollers 23 in such manner as to cause them to climb up the inclined face 26 of head 27 and down the inclined face 22 of head 21 or vice versa. The longitudinal curvature of the neck 28 of each roller 23 is such as to effect longitudinal movement of the roller in response to axial movement of the ring 28 and to accommodate the tilting action of the roller as it climbs up and down the oppositely inclined faces of the heads.

In order to equalize the contact pressures between the several rollers 23 and the heads 21 and 27 the ring 29 is preferably free to shift radially. For this purpose its supporting ring 37 is free to shift radially between the ring 32 and shoulder 33 of the carrier 34.

The variable speed transmission shown in Figs. 3 and 4 is similar in many respect to that shown in Figs. 1 and 2, except that the parts are rearranged, giving to the device of Figs. 3 and 4 somewhat different speed and torque characteristics. In the device of Figs. 3 and 4, the free-running fulcrum ring 29' is disposed within the group of planet rollers 23' instead of encircling them, so that the ring 29' bears outwardly against the necks 28' of the rollers. Also the tapered end sections 24' of the rollers bear outwardly against an inner tapered face 22' of a driven ring 21' carried by the driven shaft 15' and encircling the rollers; and the tapered end sections 25' of the rollers bear outwardly against the tapered face 26' of a non-rotating ring 27' encircling the rollers.

In this instance the ring 29' is mounted on a series of anti-friction balls 30' interposed between it and a supporting ring 31' fixed to the end of a section 10" of a drive shaft 10'. The shaft section 10" is driven from the shaft 10' through a telescoping splined connection 60 permitting the shaft section 10" to move axially with respect to the drive shaft 10', the latter being journalled in spaced bearings 11' axially fixed in a barrel 61 rotatably seated in a hollow hub 62 on the end wall 12' of the housing 13'. The barrel 61 is axially fixed in the hub 62 by a shoulder 63 at the inner end of the barrel and the hub 64 of a hand wheel 59' fixed to the outer end thereof.

The shaft section 10" extends through an elongated hub 36' of a cage 38', to which it is rigidly attached. The cage 38' is supported at its rear end by a bearing 66, axially fixed to the shaft section 10" and to an encircling bushing 67, and at its forward end by a set of anti-friction rollers 68, axially confined in an outer race 69 and in rolling engagement with a pintle 70 projecting rearwardly from the driven shaft 15'. The arrangement is such that the cage 38', shaft section 10", and fulcrum ring 29' are axially shiftable, as a unit, to effect lengthwise movement of the planet rollers 23' therewith and thereby vary the speed ratio of the transmission substantially in the manner explained in connection with the device of Figs. 1 and 2.

In this instance the axial position of the rollers 23', ring 29', and cage 38' is regulated through the bushing 67. For that purpose the bushing 67 is in screw threaded engagement with the forward end of the barrel 61 and is retained against rotation by suitable means such as a pin 50' anchored in the end wall 12' of the housing and engaged in a radial slot 51' formed in a flange 71 of the bushing. The arrangement is such that the bushing 67 may be axially advanced or retracted by rotation of the hand wheel 59' and barrel 61 to thereby correspondingly advance or retract the cage 38', ring 29' and rollers 23'.

As in the device of Figs. 1 and 2, each of the rollers 23' is provided at opposite ends with bearings 41" which are engaged in radial guide slots 40' formed in the ends of the cage 38' to retain the axis of each roller in a radial plane of the shaft section 10" and to effect a driving relation between the rollers 23', cage 38' and the drive shaft section 10".

Also, as in the device of Figs. 1 and 2, provision is made for rendering the contact pressures between the rollers 23' and rings 21', 27', and 29' responsive to the load on the device, and particularly to the torque load imposed on the non-rotating ring 27'. For this purpose a torque responsive camming device of a well known type is employed including a plurality of balls 45', which in this instance are interposed between opposed cam grooves 46' formed in the adjacent faces of the ring 27' and a reaction ring 48', the latter being seated on a centering ring 49' which in turn is seated against the end wall 12' of the housing. The contact faces of the rings 48' and 49' are preferably spherical to effect self aligning of the ring 48' with ring 27' in a manner to equalize the pressures between the balls 45' and their coacting cam grooves 46'. The ring 48' is retained against rotation in this instance by the pin 50' hereinabove mentioned which engages a radial slot 51" therein.

As in the device of Figs. 1 and 2, initial contact pressures between the several rollers 23' and the tapered faces 22' and 26' of the rings 21' and 27' are established by axial adjustment of the ring 21' and shaft 15' toward the rollers 23', this adjustment being effected by screwing the plug 20' into the hollow hub 18' against the bearings 16' in which the shaft 15' is journaled, and those pressures, thus established, are automatically increased by the torque load imposed upon the ring 27' through the camming mechanism just described. It will of course be understood that as the ring 27' tends to rotate under the torque imposed by the several rollers 23', the balls 45' react against the cam grooves 46' to produce a wedging action and thereby force the ring 27' toward the rollers to increase the pressures therebetween and between the rollers and the ring 21'.

It will also be understood of course that the several rollers 23' revolve with the cage 38', under the torque transmitted to the latter from the drive shaft 10', and that during such motion the several rollers are also caused to revolve about their individual axes by virtue of their rolling engagement with the non-rotating ring 27', and that the net result of this dual motion is imparted to the driven ring 21' and shaft 15' as a result of the rolling engagement between the rollers and the ring 21'. Also, by axial shifting of the fulcrum ring 29' in the manner above described, the several rollers 23' may be moved longitudinally to cause them to climb up one of the tapered faces 22' or 26' and down the other, or vice versa, so as to vary the planetary action of the rollers 23' and thus vary the rate and direction of rotation of the driven ring 21'.

Various changes may be made in either of the embodiments of the invention hereinabove specifically described without departing from or sacrificing the advantages of the invention as defined in the appended claims:

I claim:

1. In a variable speed transmission the combination of two annular torque reaction members one rotatable with respect to the other, a roller in frictional rolling engagement with both of said members, fulcrum means for said roller coacting with said members to provide a three-point support for said roller, said fulcrum means comprising a ring in rolling engagement with said roller, and means for effecting lengthwise adjustment of said roller relative to said members while maintaining contact between said roller and members to thereby vary the rate of rotation of one of said members relative to the other.

2. In a variable speed transmission the combination of two annular torque reaction members one rotatable relative to the other, a roller in frictional rolling engagement with both of said members, fulcrum means for said roller coacting with said members to provide a three-point support for said roller, said fulcrum means comprising a ring in rolling engagement with said roller, and means for effecting lengthwise adjustment of said roller relative to said members, said last named means including said fulcrum means.

3. In a variable speed transmission the combination of two annular torque reaction members one rotatable relative to the other, a plurality of elongated planet rollers in frictional rolling engagement with both of said members, a ring in rolling contact with said rollers providing a fulcrum therefor and coacting with said members to provide a three-point support for each of said rollers, and means for effecting relative adjustment between said rollers and members in a direction lengthwise of said rollers to vary the relative rotation between said members.

4. In a variable speed transmission the combination of two annular torque reaction members one rotatable relative to the other, a plurality of planet rollers in frictional rolling engagement with both of said members, and a ring in rolling contact with said rollers providing a fulcrum therefor and coacting with said members to provide a three-point support for each of said rollers, one of said members being adjustable to provide contact pressures between said rollers and members, and said rollers being lengthwise adjustable to vary the relative rotation between said members.

5. In a variable speed transmission the combination of a rotatable annular member, a non-rotating annular member, a plurality of planet rollers in frictional rolling engagement with both of said members, fulcrum means coacting with said members to provide a three-point support for each of said rollers, said fulcrum means comprising a ring in rolling contact with said rollers, means for driving said rollers about the axis of said non-rotating member to thereby effect rotation of said rotatable member, and means for effecting relative adjustment between said rollers and said rotating member in a direction lengthwise of said rollers to thereby vary the rate of rotation of said rotating member.

6. In a variable speed transmission the combination of a plurality of planet rollers each having two oppositely tapered sections, two coaxial torque reaction annular members one rotatable relative to the other, one of said members having a tapered contact face in frictional rolling engagement with one tapered section of each roller, the other of said members having an oppositely tapered contact face in frictional rolling engagement with the other tapered section of each roller, and a ring in rolling engagement with said rollers to provide a fulcrum therefor and by which said rollers are held in contact with said members, said rollers and members being relatively adjustably to vary the speed ratio of the transmission.

7. In a variable speed transmission the combination of a plurality of elongated planet rollers each having two oppositely tapered sections and a third section, two coaxial torque reaction members one rotatable relative to the other, one of said members having a tapered contact face encircling said rollers and in frictional rolling engagement with one tapered section of each roller, the other of said members having an oppositely tapered contact face encircling said rollers and in frictional rolling engagement with the other tapered section of each roller, and fulcrum means for said rollers engaged with said third section thereof and coacting with said members to provide a three-point support for each roller.

8. In a variable speed transmission the combination of two coaxial torque reaction members one rotatable relative to the other, each of said members having an external tapered contact face, a plurality of contact rollers disposed about said members and each having a tapered section in frictional rolling engagement with one of said faces, and a fulcrum ring encircling said rollers and in frictional rolling engagement therewith and coacting with said members to maintain an inward pressure of said rollers against said faces.

9. In a variable speed transmission the combination of two coaxial torque reaction members one rotatable relative to the other, each of said members having a tapered circular face, a plurality of planet rollers, revolvable about the axis of said members, each of said rollers having two oppositely tapered sections in frictional rolling engagement with said faces respectively, fulcrum means for said rollers coacting with said members to maintain pressure contacts between said roller sections and faces, and means for shifting said fulcrum means along the axis of said members to shift said rollers and thereby vary the speed ratio of the transmission.

10. In a variable speed transmission the combination of two annular torque reaction members one rotatable with respect to the other, a plurality of planet rollers each having a pair of tapered end heads in frictional rolling engagement with said members respectively, each of said rollers also having a reduced portion intermediate said end heads, and a fulcrum ring in frictional rolling engagement with said reduced portions of said rollers and coacting with said members to provide a three point support for each of said rollers.

ALFRED G. BADE.